United States Patent [19]

Tennes et al.

[11] 4,030,244

[45] June 21, 1977

[54] METERING AND SPRAY APPARATUS FOR HORTICULTURAL APPLICATIONS

[75] Inventors: Bernard R. Tennes, Charlotte; Clyde L. Burton, East Lansing, both of Mich.

[73] Assignee: The United States of America as represented by the Secretary of Agriculture, Washington, D.C.

[22] Filed: May 14, 1976

[21] Appl. No.: 686,424

[52] U.S. Cl. .................................. 47/1.7; 239/121; 239/124
[51] Int. Cl.² ........................................ B05B 1/28
[58] Field of Search ................. 239/121, 124, 144; 47/1.7

[56] References Cited

UNITED STATES PATENTS

| | | | |
|---|---|---|---|
| 1,416,065 | 5/1922 | Rhodes | 239/121 |
| 1,465,557 | 8/1923 | Oldham | 47/1.7 UX |
| 1,669,435 | 5/1928 | Wheeler | 47/1.7 |
| 1,807,469 | 5/1931 | Brehmer | 47/1.7 |
| 2,111,030 | 3/1938 | Mote | 47/1.7 X |
| 2,977,715 | 4/1961 | Lindsay | 47/1.7 |
| 3,341,970 | 9/1967 | Bailey | 47/1.7 |

*Primary Examiner*—Robert E. Bagwill
*Attorney, Agent, or Firm*—M. Howard Silverstein; David G. McConnell; Curtis P. Ribando

[57] ABSTRACT

The apparatus comprises a combination of a novel system for selectively metering and mixing horticultural spray materials immediately prior to application and a novel recirculating sprayer system for application of the mixed materials to horticultural plants.

13 Claims, 7 Drawing Figures

METERING AND SPRAY APPARATUS FOR HORTICULTURAL APPLICATIONS

CROSS-REFERENCES TO RELATED APPLICATIONS

This application is related to copending application Ser. No. 686,423, filed concurrently herewith.

BACKGROUND OF THE INVENTION

The field of this invention relates to the application of spray materials to horticultural plants. The invention has utility for all known plants, inclusive of vegetable row crops, berry bushes, standard-sized fruit trees, ornamental shrubbery, grasses, and others. However, it is most useful for plants adapted to hedgerow growth, such as dwarf and semidwarf fruit trees. The apparatus of the invention can be used in conjunction with all materials which normally exist as, or which can be converted to, a sprayable form.

In a conventional crop-spraying operation, several spray materials are mixed together at a loading station in a quantity of up to several hundred gallons. The mixture is then carried to the field in the tank of a mobile sprayer unit and applied to the crops by means of a handgun or a spray boom. These devices operate on the basis of either a high-pressure stream of the liquid spray material, or a high-velocity air stream which carries injected spray material to the target foliage.

Disadvantages of these mixing and spraying procedures are numerous. Many spray chemicals are highly toxic to humans and handling of them presents a serious health hazard. Extra precautionary measures during the loading and mixing of the spray materials and during the cleaning of the tank are necessary in order to prevent skin contact, inhalation, and inadvertent swallowing of the toxic compounds. Other mixing precautions must be taken in order to obtain maximum effectiveness. Certain combinations of chemicals are incompatible; some chemicals in aqueous admixture interact over a period of time; some formulations can cause phytotoxicity to sensitive plants at different stages of growth; and excessive amounts of certain chemicals or the use of wrong ones can result in a residue problem. Moreover, once the chemicals are mixed, the operator is inflexible to supply particular trees or rows of plants with their individual chemical needs. Flushing and cleaning of the apparatus is time-consuming and dangerous, and failure to do so may result in clogging and corrosion of the tank, nozzles, hoses, pump, and other pieces of equipment. Disposal of unused spray materials in the tank presents still another problem. For lack of a better way, the material is often dumped onto the ground. This creates an environmental problem by contaminating the surrounding soil and possibly the water supply.

Conventional sprayers lack the ability to evenly apply the spray material to all foliage surfaces. Tests performed by Harrell et al. (U.S. Dep. Agric. ARS-S-65, August 1975) indicate that the bulk of the spray material never strikes its target but becomes airborne and drifts away. Wind accentuates the spray drift problem and frequently precludes effective spraying. Much of what does strike the foliage is unevenly distributed and runs off into the soil. Distribution uniformity can be improved by decreasing the droplet size. Unfortunately, smaller droplets are more susceptible to drifting. Spray drift and run-off result in waste of expensive chemicals and create both an environmental problem and a health hazard for the operator. Harrell et al. (supra) attempted to reduce spray losses by situating a collector opposite the plant from the spray nozzle and recycling the collected spray material to the nozzle. Use of the apparatus under test conditions only slightly increased the amount of spray deposited on the plant and still left 90% of the material unaccounted for.

Coverage uniformity with a conventional sprayer is complicated by other factors. The quantity of spray emitted from the nozzle per unit time is a function of pressure which is dependent upon variable factors such as nozzle wear, screen resistance, and line resistance. Moreover, spray coverage for a given nozzle output is directly related to vehicle speed. For example, when the vehicle travels uphill at a relatively slow rate, the degree of foliage coverage is significantly greater than at the faster downhill rate. This frequently results in detrimental overdosing or underdosing of the crops being sprayed.

SUMMARY OF THE INVENTION

The apparatus of the instant invention overcomes the disadvantages of both the mixing and the spraying operations of the prior art. It provides a readily controllable system for on-the-spot mixing of desired spray material in predetermined amounts and for feeding the mixed materials to a sprayer. In the preferred embodiment, the sprayer is an over-the-row recirculating sprayer not heretofore known in the prior art.

It is an object of the present invention to reduce the hazardous and time-consuming handling of spray materials normally incurred in loading the tank, mixing the materials, and flushing and cleaning the spray equipment.

It is another object of the instant invention to maintain maximum chemical effectiveness not always possible by the prior technique of premixing the chemicals in a tank at a loading station.

It is also an object of the invention to eliminate the environmental and health hazards associated with disposal of unused spray materials.

It is an object of the novel apparatus to provide on-the-spot flexibility in supplying plants with their individual chemical needs.

It is a further object of the instant invention to provide a spray system which optimally and uniformly applies spray materials to plants independent of travel speed of the vehicle.

It is also an object of the apparatus of the invention to increase the efficiency of the spray process by decreasing the amount of spray lost to run-off and spray drift and by permitting the use of ultrafine spray droplets.

It is another object of the present invention to provide a spray apparatus which can be operated in windy conditions without environmental problems or health hazard produced by spray drift.

Finally, it is an object of the invention to provide a combination metering and spray apparatus adaptable to a conventional over-the-row type power frame, which can be readily converted from the sprayer function to the harvester function and vice versa.

These and other objects and advantages of the invention will become apparent from the description which follows and from the accompanying drawings.

DESCRIPTION OF THE PREFERRED EMBODIMENT

The apparatus of this invention has application in the spraying of all types of horticultural plants. Its use is anticipated for, but not limited to, vegetable row crops, berry bushes, standard-sized fruit trees, dwarf and semidwarf fruit trees, ornamental shrubbery, grasses, and other types of vegetation. It is particularly useful for hedgerow crops grown for "over-the-row" harvesting, such as dwarf and semidwarf fruit trees and blueberries. Crops grown for "over-the-row" harvesting are known in the art as those whose natural size has been selected or controlled to permit harvesting of the fruit by means of a straddle harvester such as that shown in FIGS. 1 and 2 of Harrell et al. (J. Econ. Entomol. 63(2): 382–385, April 1970). "Hedgerow" refers to a row of closely spaced plants resembling a hedge.

The spray materials which are contemplated for use in the apparatus include, but are not limited to, fungicides, insecticides, pesticides, herbicides, miticides, abcission inducers, pollen, nutrients, water, steam, and various spray adjuvants, such as wetting agents, sticking agents, coloring agents, buffers, foam reducers, spreading agents, etc., all as well known in the art. They may be in the form of flowable liquids, foams, solids, vapors, and gases; and may be applied singly, in simple admixture, in solution, in suspension, and in concentrated or dilute form. Most commonly, a plurality would be applied together in aqueous admixture.

Figure 1:
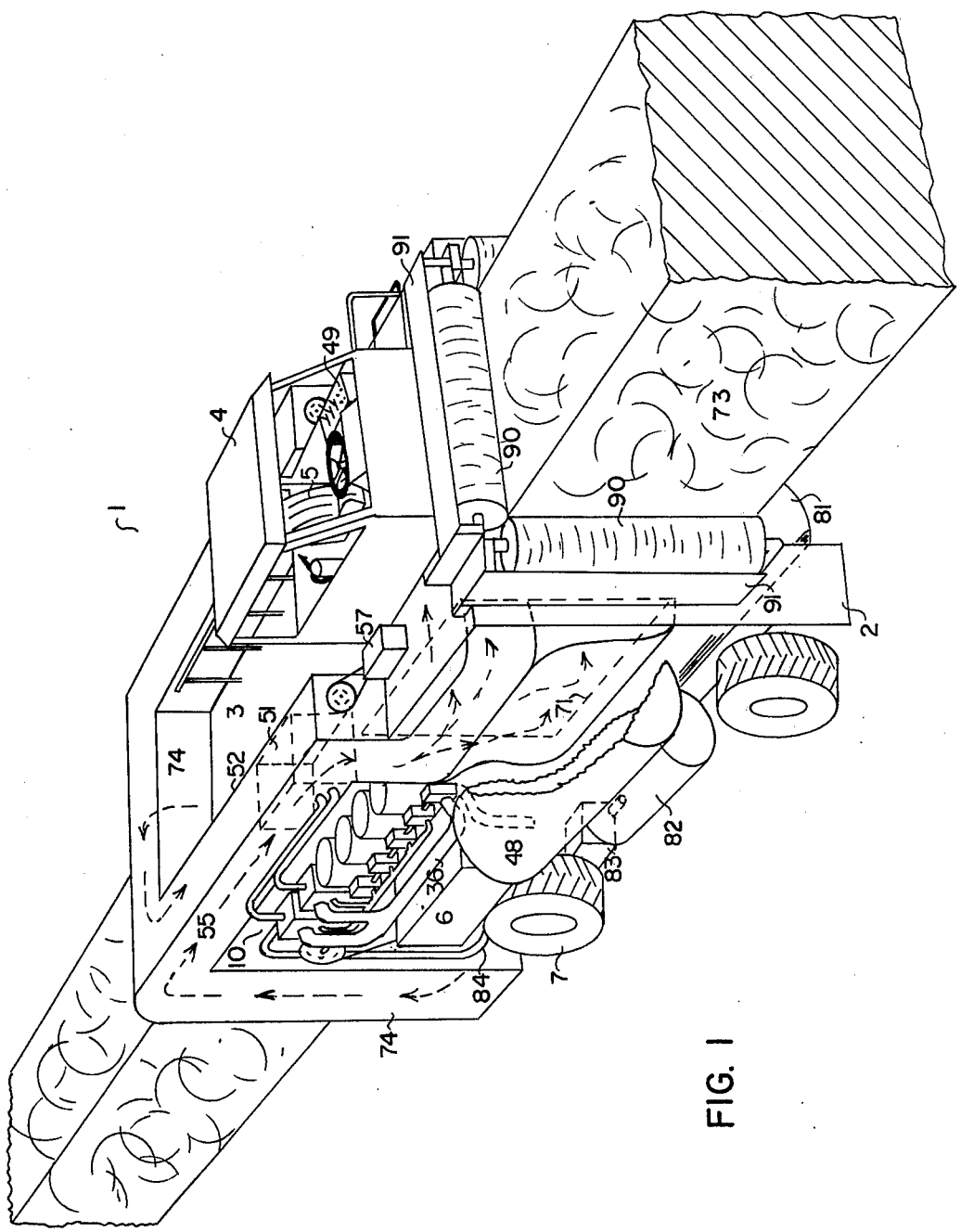
FIG. 1 is a perspective view in partial phantom of the metering and spray apparatus of the instant invention.

In referring to FIG. 1, the metering and spray apparatus of the instant invention employs the power frame 1 of an over-the-row straddle harvester as is well known in the art. The frame itself does not constitute part of the invention and will be described only to the extent necessary for an understanding of how it cooperates with the metering and spray systems. The frame basically comprises vertical sides 2 interconnected across the top by supporting means 3. The sides are not interconnected at the bottom in order to permit unencumbered passage of the frame over a row of horticultural plants. The frame includes a roof enclosure 4 which houses the operator's seat 5 and is powered by motor 6 and gearing mechanism (not shown) for driving the wheels 7.

Figure 2:
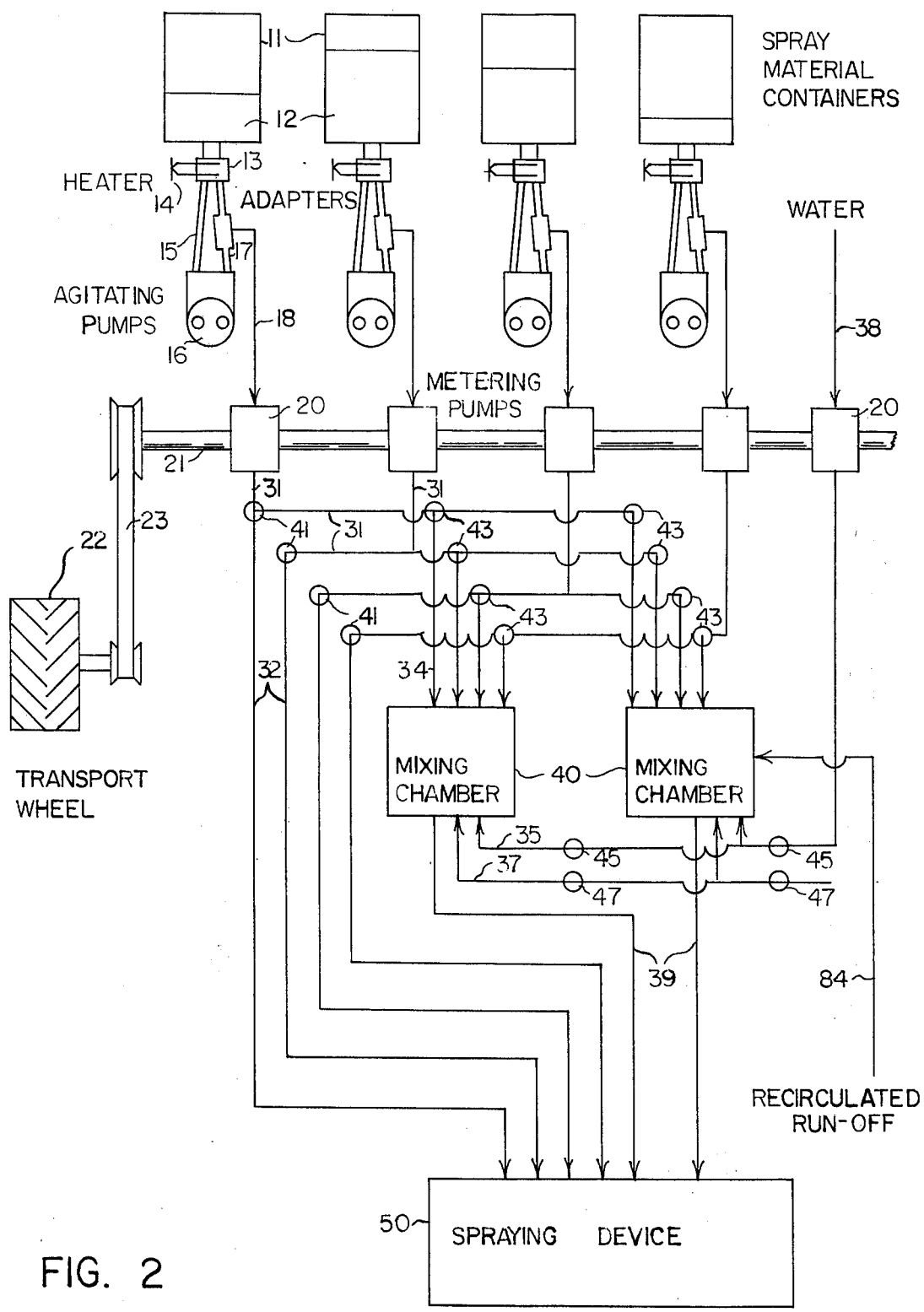
FIG. 2 is a schematic diagram of the spray material metering system of the present invention.
Figure 3:
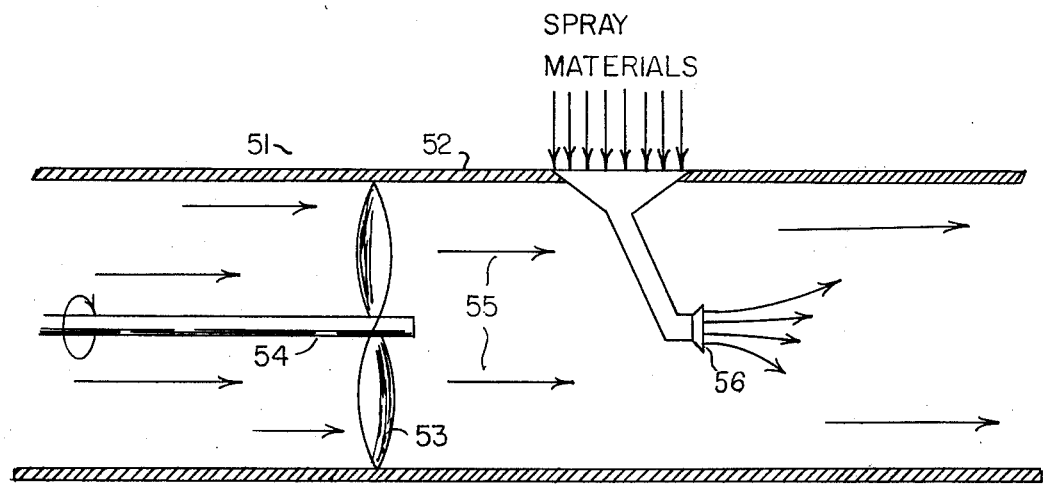
FIG. 3 is a drawing of one embodiment of the spray material suspending device.
Figure 4:
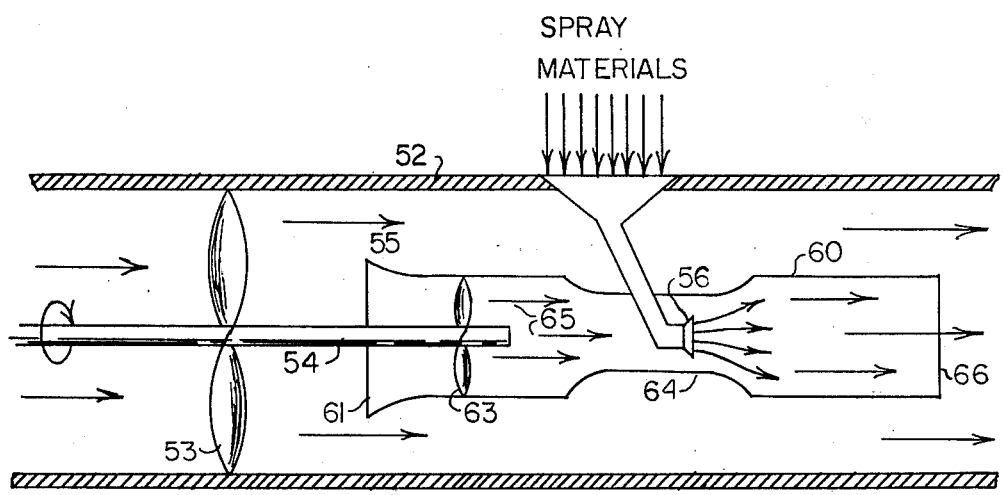
FIG. 4 is a drawing of another embodiment of the spray material suspending device.
Figure 5:
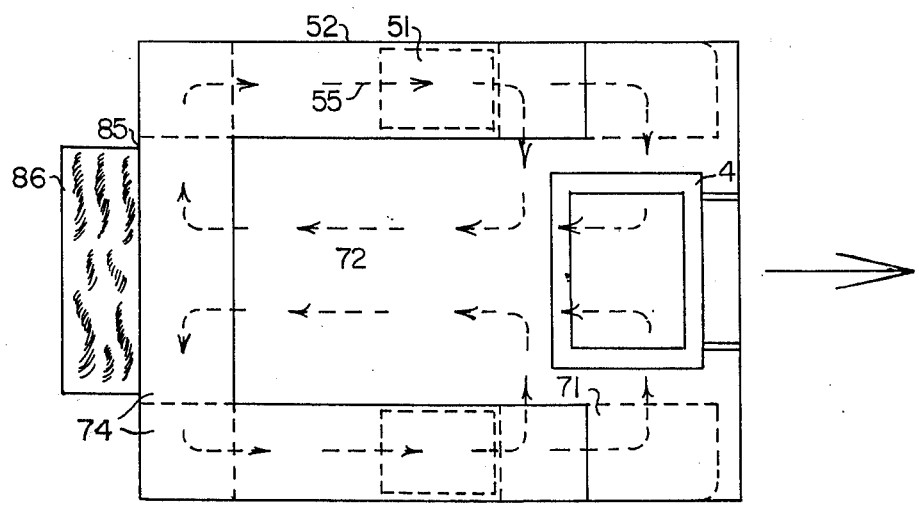
FIG. 5 is a top-plan view of the air recirculation system of the apparatus shown in FIG. 1.
Figure 6:
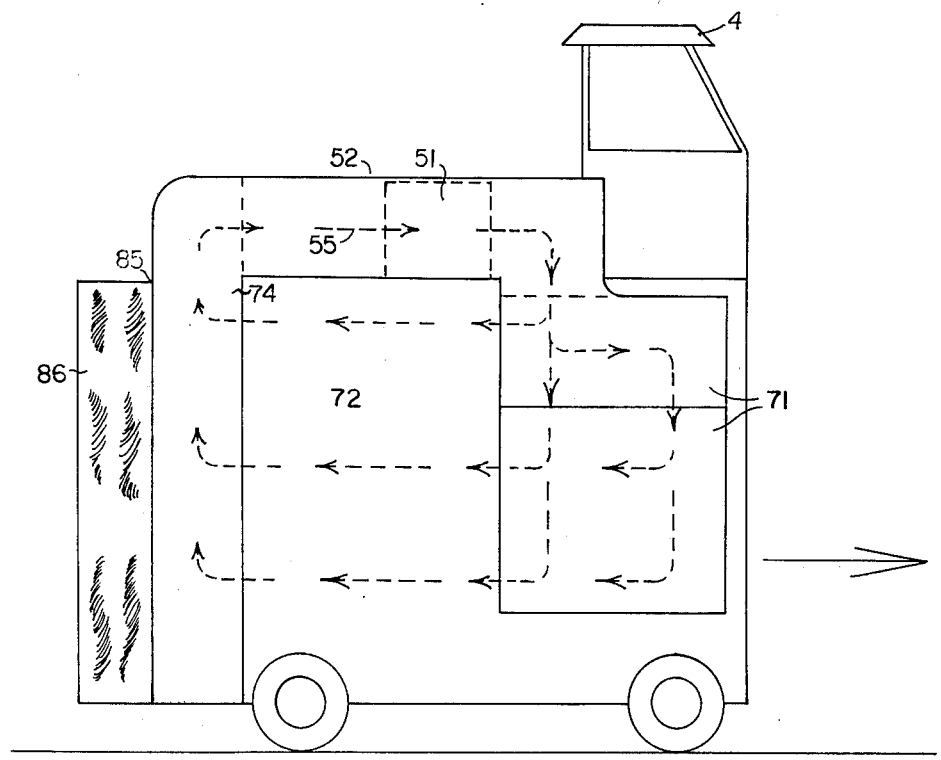
FIG. 6 is a side elevation of the air recirculation system of the apparatus shown in FIG. 1.
Figure 7:
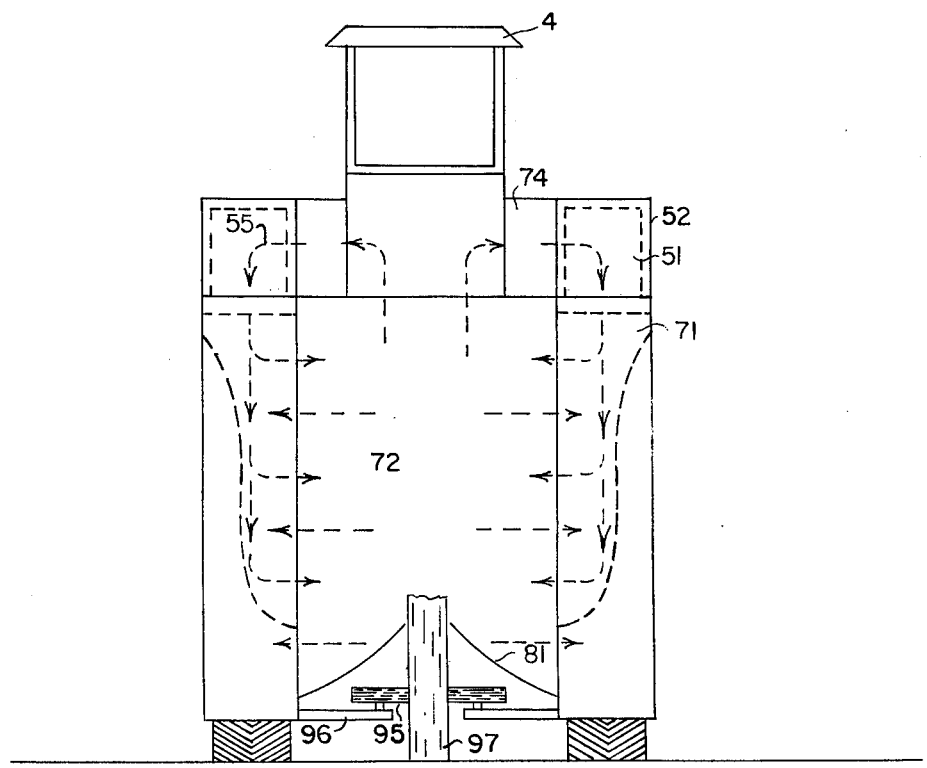
FIG. 7 is a front elevation view of the air recirculation system of the apparatus shown in FIG. 1.

The metering system generally indicated by numeral 10 is removably mounted on one of the sides of the power frame. The details of the metering system are schematically depicted in FIG. 2. It comprises a plurality of containers 11 for storing the various spray materials 12. The containers may be of any construction, either rigid or flexible, and preferably conform with EPA standards. Each container has a material flow opening which is fitted to an adapter 13 and may be provided with a suitable valve means (not shown) to enable mounting and removal of the containers from the adapters without spillage. The adapters are designed to support the containers 11 and permit free passage of the spray materials through the openings thereof. Each adapter is provided with switched heating element 14 and communicates with intake line 15 and return line 17 of agitating pump 16. The agitating pumps function to maintain homogeneity and flowability of the spray materials and also assist in maintaining a positive pressure inside the containers. Supply lines 18 connect return lines 17 with metering pumps 20. If desired, each line 18 could be split by means of a manifold into dual metering pumps, each of which would feed into a separate mixing and spraying system to permit independent control to the right and left sides of the sprayer. The metering pumps are driven by shaft 21 which is powered by one of the transport wheels 22 and any suitable gearing mechanism 23 such as that illustrated. The pumps 20 may be of any conventional construction such that they can be adjustably regulated to emit a predetermined amount of chemical per unit distance traveled. Each metering pump feeds into a line 31 having a selector valve 41 for directing the spray material either directly into the spray system 50 via line 32 or to one or a plurality of mixing chambers 40 via line 34. Selector valves 43 are provided for independent flow control to each chamber. Though two mixng chambers have been represented in the drawing, any number may be provided. Each chamber is fed by water supply line 35 and a line 37 for compressed air or other suitable propellant. Selector valves 45 and 47 regulate the water and propellant flows, respectively. The water source is tank 48 mounted on the side of the power frame as shown in FIG. 1. Line 38 feeds water from tank 48 to one of the metering pumps 20 described above, whereby the water is then metered to mixing chambers 40 via line 35. The air supply not only acts as a propellant but also assists in mixing the spray materials. The mixed materials are conducted through lines 39 from the chambers 40 to the spraying apparatus 50.

The selector valves 41, 43, 45, and 47 can be operated by any suitable mechanical or electrical means, preferably controlled by a switch panel 49 (shown in FIG. 1) easily accessible to the operator. This would permit instant flexibility in selecting chemicals or chemical combinations under field conditions.

The sprayer system may be of any conventional type to include air blast sprayers, hydraulic boom sprayers, and others. However, the advantages and objectives of the instant invention are best realized by employing the novel spray system hereafter described.

The sprayer system comprises a pair of suspending devices 51 mounted near the top and on either side of the power frame as best shown in FIG. 5. One embodiment of the suspending device is shown in FIG. 3. It comprises fan blade 53 mounted on shaft 54 to convect the recirculating air stream 55 through air tunnel 52. The shaft and fan blade are rotated by motor 57 (FIG. 1) positioned in any convenient place on the power frame. Spray material is introduced into the air tunnel by means of inlet 56 whereupon it becomes suepended in the air stream.

A preferred device for suspending the spray material is shown in FIG. 4. In this embodiment, a Venturi discharge unit 60 is positioned within tunnel 52. The discharge unit comprises: air stream inlet 61; fan blade 63 mounted on shaft 54 for concurrent rotation with blade 53; throat 64 for increasing the velocity and decreasing the pressure of the portion 65 of air stream 55 passing therethrough; and air stream outlet 66. Spray material inlet 56 is located within throat 64. The function of the Venturi is to break up the spray material into fine droplets and suspend it in recirculating air stream 55.

The remainder of the sprayer system is best illustrated in FIGS. 1 and 5–7. The downstream sides of air tunnels 52 communicate with outlet vents 71, one on either side of the power frame. These vents open to the inner spray zone 72 containing foliage 73. Collecting means 74 are provided along the sides and across the top in the rear of the power frame for collecting the excess spray material and recirculating it through air tunnel 52, suspending device 51, and back into spray zone 72.

The apparatus additionally includes catching surfaces 81 affixed to the lower inside portions of either side of the power frame and positioned to catch excess spray run-off from the foliage. The surfaces channel the run-off into collecting tank 82 which communicates with pump 83 and line 84. Line 84 feeds into one of the mixing chambers 40 for recirculating the spray material to suspending devices 51. Any spray drift that occurs at the rear of the power frame is minimized by trailing air lock 85. The air lock is formed by flaps 86 which act to seal the spray zone 72 from the ambient around the top and sides of the foliage. The flaps are preferably constructed of a flexible material such as canvas, rubber, or polyethylene.

To minimize damage to the foliage entering the spray zone, the sides and top of the power frame are provided with rollers 90. The rollers are preferably made of a soft spongy-type material and are mounted for free rotation upon their axes. In operation, they frictionally engage with the foliage as the power frame advances, thereby rotating and introducing the foliage into the spray zone. Thin plates 91 are mounted on the front of the frame and tangential to the periphery of the rollers to minimize spray drift from the front of the sprayer.

When the horitucultural plants are trees, the power frame may be guided by means of feeler wheels 95. Any number of pairs may be employed as deemed necessary. The feeler wheels are horizontally mounted on arms 96 in a manner which permits free rotation. Arms 96 are pivotally mounted to power frame 1 enabling tree trunks 97 of varying sizes to pass between the feeler wheels. In so doing, the operator is able to align the tree foliage within the spray zone of the apparatus. In a preferred design, the feeler wheels are equipped with electronic sensors which feed into an indicator system by which the operator can more easily align the power frame over the trees. In a more preferred embodiment, the electronic sensors feed into an automatic control system, which guides the power frame without the assistance of an operator. The sensing means and automatic control system may be any of those known in the art, the details of which do not constitute novelty within the instant invention.

OPERATION OF THE PREFERRED EMBODIMENT

In the preferred application of the instant invention, the spray materials 11 would be shipped from the manufacturer and stored by the operator in containers 12. The outlet of each container would have a specific size and shape coded to the function of its contents. Each feed line 18 and metering device 20 would also be coded on the operator's switch panel 49 for a specific type of spray material. Each adapter would be designed to receive only a container of spray material matching the operator's code for that particular feed line. Thus, for example, a container of fungicide would have an outlet designed to fit only onto the adapter of the feed line coded at the operator's switch panel for fungicide. This system would eliminate confusion in the mixing of spray materials and alleviate the handling difficulties of transferring the chemicals from the shipping container to the mixing tank of the spray apparatus.

For purposes of illustration only, the operation of the spray and metering apparatus will be described in reference to treating semidwarf fruit trees. As the power frame approaches a row of trees, the metering pumps 20 are regulated to restrict all flow of the spray materials 12. The operator visually aligns the frame over the trees causing the rollers 90 to frictionally engage with the foliage 73 and rotate in a direction which assists the introduction of the foliage into spray zone 72. The leading edges of the rollers rotate toward the median line of the spray zone. The feeler wheels 95 contact the tree trunks and assist in centering the power frame over the trees. When tied in with an automatic control system, they sense the position of the frame with respect to the tree trunks and signal the reading to the control system which then corrects the course as necessary.

As the sprayer proceeds down the row, heating elements 14 and agitating pumps 16 are operated as necessary to maintain flowability and homogeneity. When treatment is required, the operator selects the desired chemicals and regulates the metering pumps 20 to provide the desired proportions. The materials may be injected directly into the suspending devices 51, or may be shunted to one or more of the mixing chambers 40 by means of selector valves 41, 43. In the mixing chambers, the materials may be diluted with water from line 36. Compressed air from line 37 promotes the mixing and acts to propel the mixtures into suspending devices 51 which preferably employs the Venturi discharge unit described above.

In the Venturi, the fan blade 63 generates air stream 65 which is forced through constriction 64. At this point, the stream velocity is increased sufficiently to suspend the injected spray material and carry it into air stream 55 generated by fan blade 53. The air stream with the suspended spray is emitted from outlet vent 71 and into spray zone 72 for contact with the tree limbs, foliage, and fruit. The spray which remains in suspension in zone 72 is drawn into collecting means 74 and recirculated through the system as the sprayer proceeds down the row. Run-off from the foliage is collected by catching surfaces 81 and accumulated in collecting tank 82. It is then pumped by means of pump 83 and line 84 to one or more of mixing tanks 40 for recirculation into the system.

Throughout the spraying operation, the operator controls the combination and the proportions of the materials to be directed into the spray zone by means of control panel 49.

Upon completing the spray operation, the metering pumps 20 are shut down. Lines 31-38, mixing tanks 40, and the entire spray system are then flushed with water from tank 48. Unused spray materials 12 may remain stored in their containers 11 on the side of the power frame for future use, or the containers may be removed from adapters 13 and stored in a suitable location.

It is to be understood that the foregoing detailed description is given merely by way of illustration and that modification and variations may be made therein without departing from the spirit and scope of the invention.

We claim:

1. An apparatus for spraying materials onto horticultural plants comprising:
   a power frame adapted to straddle the foliage of said horticultural plants,
   means attached to said power frame for suspending spray materials into an air stream,
   means for conducting said air stream with said suspended spray materials into a spray zone containing said horticultural plants and within the confines of said power frame,
   means for recirculating said air stream from said spray zone to said suspending means, and
   at least one metering means mounted on said power frame for metering at least one spray material to said suspending means, said metering means comprising:
      a container for holding said spray material, said container having an opening,
      an adapter for removably mounting said container and for permitting passage of said spray material through said container opening to a first conduit means, and for permitting return of said spray material through said container opening from a second conduit means,
      an agitating pump for circulating said spray material through said first and second conduit means, and
      a metering pump for metering said spray material to said suspending means, said metering pump connected to said second conduit means by a third conduit means, and further connected to said suspending means by a fourth conduit means, and wherein said metering pump is driven by a power shaft which rotates in direct proportion to the distance traveled by said power frame.

2. The apparatus defined in claim 1 wherein:
   said air stream recirculating means comprises an air tunnel on each side of said power frame, and a fan positioned within each of said air tunnels, and
   said suspending means comprises a spray material inlet within each of said air tunnels and downstream from said fans.

3. The apparatus defined in claim 1 wherein:
   said air stream recirculating means comprises an air tunnel on each side of said power frame and a first fan positioned within each of said air tunnels, and
   said suspending means comprises a Venturi discharge unit within each of said tunnels and downstream from each of said fans, each unit having an air inlet, a throat, an air outlet, and a second fan within said air inlet for directing at least a portion of said air stream through the unit, and further having a spray material inlet positioned within the throat of said unit for feeding said spray material into said portion of said air stream.

4. The apparatus defined in claim 1 wherein:
   said conducting means comprises a vent on each side and toward the front of said power frame and opening into said spray zone, and
   said air stream recirculating means comprises a collecting means in the rear of said power frame and extending horizontally across the top and vertically down the sides of said frame, said collecting means opening into said spray zone for collecting excess suspended spray material.

5. The apparatus defined in claim 1 and further comprising:
   means for catching run-off spray liquid from said horticultural plants, and
   means for recirculating said liquid from said catching means to said suspending means.

6. The apparatus defined in claim 1 and further comprising:
   means for introducing said foliage of said horticultural plants into the spray zone, said foliage introducing means comprising a plurality of rollers mounted for free rotation on the front of said power frame and positioned to frictionally engage with the foliage as the power frame advances.

7. The apparatus defined in claim 1 and further comprising:
   means for positioning said power frame over said horticultural plants, said positioning means comprising at least one pair of wheels, wherein the members of said wheel pair are horizontally mounted on opposing sides of said power frame for free rotation, and each member is spaced from the other member a distance sufficient to permit passage therebetween of the trunks of said horticultural plants, and sufficient to enable guidance thereby of the power frame over said plants.

8. The apparatus defined in claim 1 and further comprising:
   a plurality of said metering means,
   at least one mixing chamber, said mixing chamber having an inlet means in communication with each of said fourth conduit means a water inlet means, a propellant inlet means, and an outlet means in communication with said suspending means, and
   a number of selector valves located in said fourth conduit means sufficient to independently control the flow of each of a plurality of spray materials from each of said plurality of metering means to said at least one mixing chamber and said suspending means.

9. The apparatus defined in claim 1 wherein:
   a heater means is provided in said adapter for heating said circulating spray material.

10. An apparatus for spraying materials onto horticultural plants comprising:
    a power frame adapted to straddle the foliage of said horticultural plants,
    means attached to said power frame for suspending spray materials into an air stream,
    means for conducting said air stream with said suspended spray materials into a spray zone containing said horticultural plants and within the confines of said power frame, and
    means for recirculating said air stream from said spray zone to said suspending means,
    said air stream recirculating means comprising an air tunnel on each side of said power frame and a first fan positioned within each of said air tunnels, and a collecting means in the rear of said power frame and having an opening into said spray zone for collecting excess suspended spray material, said opening extending horizontally across the top and vertically down the sides of said frame, and said suspending means comprising a Venturi discharge unit within each of said tunnels and downstream from each of said fans, each unit having an air inlet, a throat, and air outlet, and a second fan within said air inlet for directing at least a portion of said air stream through the unit, and further having a spray material inlet positioned within the throat of said unit for feeding said spray material into said portion of said air stream.

11. The apparatus defined in claim 10 and further comprising:

means for catching run-off spray liquid from said horticultural plants, and means for recirculating said liquid from said catching means to said suspending means.

12. The apparatus defined in claim 10 and further comprising:

means for introducing said foliage of said horticultural plants into the spray zone, said foliage introducing means comprising a plurality of rollers mounted for free rotation on the front of said power frame and positioned to frictionally engage with the foliage as the power frame advances.

13. The apparatus defined in claim 10 and further comprising:

means for positioning said power frame over said horticultural plants, said positioning means comprising at least one pair of wheels, wherein the members of said wheel pair are horizontally mounted on opposing sides of said power frame for free rotation, and each member is spaced from the other member a distance sufficient to permit passage therebetween of the trunks of said horticultural plants, and sufficient to enable guidance thereby of the power frame over said plants.

* * * * *